United States Patent

Wheaton

[15] 3,665,503

[45] May 23, 1972

[54] ELECTRICAL INVERTER CIRCUIT ARRANGEMENTS

[72] Inventor: Roger W. Wheaton, North Baddesley, England

[73] Assignee: Plessey Handel und Investments A.G., Zug, Switzerland

[22] Filed: Jan. 11, 1971

[21] Appl. No.: 105,517

[30] Foreign Application Priority Data

Jan. 9, 1970 Great Britain ........................1,107/70

[52] U.S. Cl. ..........................................................321/45 R
[51] Int. Cl. ..........................................................H02m 7/48
[58] Field of Search ................................321/2, 12, 45, 45 C

[56] References Cited

UNITED STATES PATENTS

| | | | |
|---|---|---|---|
| 3,119,058 | 1/1964 | Genuit | 321/45 |
| 3,317,815 | 5/1967 | Merritt | 321/45 |
| 3,351,840 | 11/1967 | Yearley | 321/45 |
| 3,490,027 | 1/1970 | Galetto et al. | 321/11 X |

*Primary Examiner*—William M. Shoop, Jr.
*Attorney*—Mason, Mason & Albright

[57] ABSTRACT

A transistor inverter circuit comprises two transistors which are switched on alternately via respective control circuits. Each control circuit provides a direct path for a TURN OFF pulse but incorporates in the turn on path a silicon controlled rectifier associated with a time delay circuit which delays the switching on of the silicon controlled rectifier after occurrence of the TURN ON pulse. Thus, each transistor receives a TURN OFF pulse immediately but the other transistor does not receive the TURN ON pulse until a time delay has lapsed. The time delay is sufficient to ensure that each transistor is fully switched off before the other is turned on.

7 Claims, 1 Drawing Figure

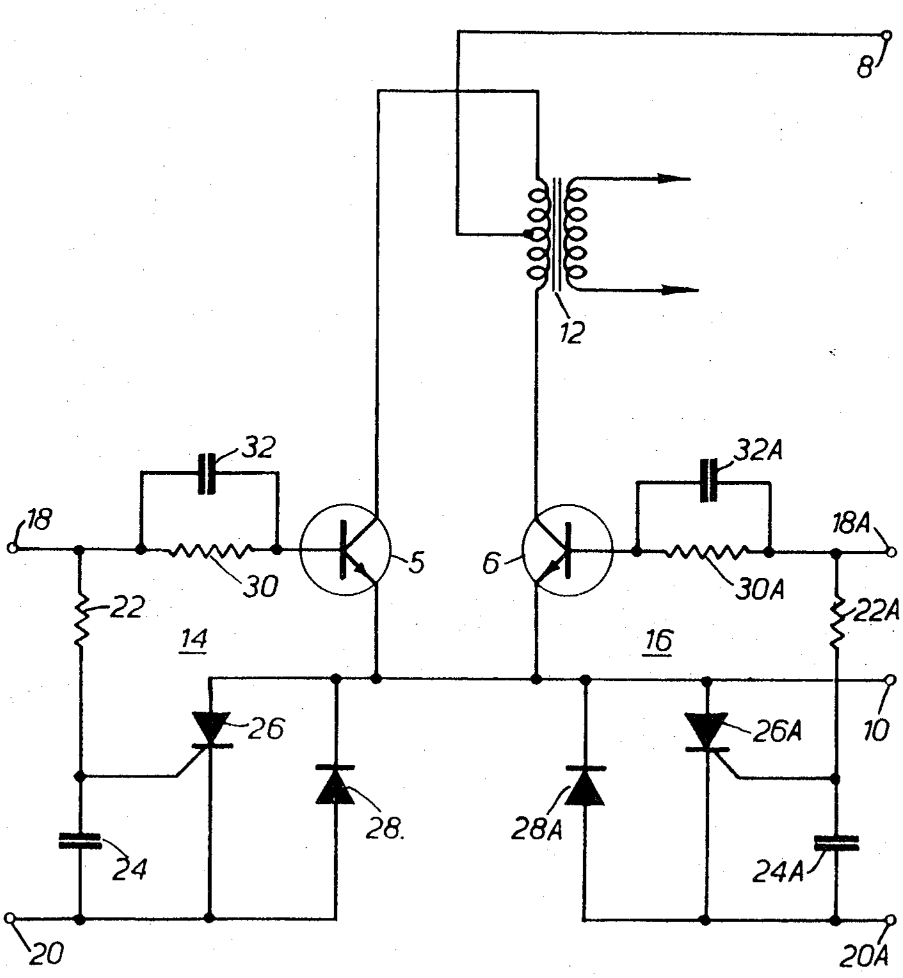
INVENTOR
ROGER W WHEATON
BY
Mason, Mason & Albright
ATTORNEYS

ELECTRICAL INVERTER CIRCUIT ARRANGEMENTS

BACKGROUND OF THE INVENTION

The invention relates to electrical inverter circuit arrangements, and more particularly to those employing semi-conductor means such as transistors which are arranged to be switched on alternately to provide an alternating output.

Electrical inverter circuit arrangements are known comprising two transistors having their emitter-collector paths connected in parallel, and arranged to be switched on alternately, one of the transistors having a suitable output device such as a transformer winding in its collector path. With such circuit arrangements, a problem arises where the TURN OFF time of the transistors is inherently longer than the TURN ON time. In power transistors operating at large currents, this difference can be as much as several microseconds, and every half cycle both transistors can be on for this length of time. This can cause large currents to be passed by the transistors with voltages of up to twice the supply voltage across them, resulting in considerable power being dissipated in the transistors. In high frequency inverters, this problem can become sufficiently acute to result in overheating or destruction of the transistors.

An object of the invention, therefore, is to provide an electrical inverter circuit arrangement capable of overcoming this problem.

According to the invention, there is provided an electrical inverter circuit arrangement, comprising a plurality of controllable semi-conductor means, and control means connected to the semi-conductor means and operative when energized to cause the semi-conductor means to be switched on and off in a predetermined order, the control means including delay means operative to delay the switching on of each of the semi-conductor means by a sufficient time delay to ensure that the preceding semi-conductor means in the said order is first switched off.

BRIEF DESCRIPTION OF THE DRAWINGS

An electrical inverter circuit arrangement embodying the invention will now be described, by way of example only, with reference to the accompanying drawing which is a circuit diagram of the inverter arrangement.

DETAILED DESCRIPTION

The inverter arrangement comprises a pair of NPN transistors 5, 6 which are connected in parallel between d.c. supply terminals 8, 10, the collector circuit of transistor 6 including the primary winding of an output transformer 12.

Each transistor has a control circuit 14, 16, connected between its base and emitter electrodes. Thus, the control circuit 14 has a pair of control terminals 18, 20, across which is connected the series combination of a resistor 22 and a capacitor 24. The junction between the resistor and the capacitor is connected to the gate electrode of a silicon controlled rectifier 26 which connects the emitter of the transistor 5 to the terminal 20. A rectifier 28 provides a bypass path for the controlled rectifier 26. The terminal 18 of the control circuit 14 is connected to the base of the transistor 5 by a resistor 30 which is shunted by a capacitor 32.

The control circuit 16 is identical to the control circuit 14, its components being distinguished by the suffix "A."

In use, the transistors 5 and 6 are alternately rendered conductive so as to produce an alternating output in the secondary winding of the transformer 12. The transistors 5 and 6 are turned on and off by TURN ON and TURN OFF pulses, these pulses being applied to the terminals 18, 20 and 18A, 20A as appropriate. Thus, if transistor 6 is conducting and transistor 5 is non-conducting, a TURN OFF pulse is applied across terminals 18A and 20A and, simultaneously, a TURN ON pulse is applied between terminals 18 and 20. The TURN OFF pulse renders terminal 20A positive with respect to terminal 18A, and a turn-off current therefore passes through rectifier 28A and thence through the emitter-base circuit of transistor 6 and turns off the transistor 6. The simultaneously-applied TURN ON pulse applied to terminals 18 and 20 renders terminal 18 positive with respect to terminal 20. Rectifier 28 is thus back-biased and cannot conduct. The silicon controlled rectifier 20 is initially non-conducting, and therefore no turn-on current passes through transistor 5 which remains off. After a time delay determined by the values of the resistor 22 and capacitor 24, the silicon controlled rectifier 26 switches on, thus allowing turn-on current to pass through and to switch on transistor 5. The inverter is now, therefore, in a state in which transistor 5 is on and transistor 6 is off.

A TURN OFF pulse is then applied between terminals 18 and 20 and, simultaneously, a TURN ON pulse is applied between terminals 18A and 20A. The TURN OFF pulse immediately drives a turn-off current through rectifier 28 to switch off transistor 5. The TURN ON pulse, however, cannot drive a turn-on current through transistor 6 until the silicon controlled rectifier 26A has been rendered conductive by sufficient charge accumulating on capacitor 24A.

It will therefore be seen that the provision of the silicon controlled rectifiers 26 and 26A, with their associated resistance-capacitance circuits, ensures that each of the inverter transistors is not switched on immediately the TURN ON pulse occurs, but only after a predetermined delay has elapsed. This time delay is selected so as to allow the on transistor to be completely switched off by the TURN OFF pulse. When a transistor operates as a saturating switch, the turn-off time is inherently longer than the turn-on time. In power transistors operating at large currents, the difference in time can be as much as several microseconds. If the silicon controlled rectifiers 26 and 26A are omitted, therefore, it is possible for both the transistors 5 and 6 to be on simultaneously for several microseconds during each half cycle. This can cause large currents to be passed by the transistors at voltages of up to twice the supply voltage resulting in considerable power being dissipated in the transistors. At high frequency, the problem may become acute resulting in overheating or destruction of the transistors. This effect is obviated by the provision of the silicon controlled rectifiers 26 and 26A.

The time delay provided by the silicon controlled rectifiers 26 and 26A can be adjusted to any required value by adjusting the parameters of the resistance-capacitance circuits, and is independent of any other circuit parameter.

The control circuits 14 and 16 can be used equally satisfactorily, after appropriate modification if necessary, with other forms of inverter circuits, such as a bridge-type circuit, and there may be any number of parallel transistors in each arm of the inverter.

I claim:

1. An electrical inverter circuit arrangement, comprising
a plurality of transistors,
control means connected to the transistors and operative when energized to cause the transistors to be switched on and off in a predetermined order and including, for each transistor, a control circuit operative in response to a TURN ON Pulse to switch the transistor on and in response to a TURN OFF pulse to switch the transistor off,
each control circuit including
a switching device blocking the application of a turn on current to the transistor until rendered operative,
time delay means responsive to each TURN ON pulse to render the device operative after a time delay whereby to feed turn on current to the transistor to switch it on, and
means responsive to each TURN OFF pulse to bypass the switching device whereby each TURN OFF pulse immediately feeds turn off current to the transistor to switch it off,
the length of the said time delay being such as to delay the switching on of each of the transistors sufficiently to ensure that the preceding transistor in the said order is first switched off.

2. An electrical inverter circuit arrangement, comprising
a plurality of transistors, control means connected to the transistors and operative when energized to cause the transistors to be switched on and off in a predetermined order and including a respective control circuit connected to each transistor and operative in response to a TURN ON pulse to switch the transistor on and in response to a TURN OFF pulse to switch the transistor off, each said control circuit comprising an electronic switching device connected in circuit with the respective transistor to block each TURN ON pulse applied to the control circuit until the switching device is rendered operative, a time delay circuit connected to the switching device and responsive to each TURN ON pulse applied to the circuit to render the switching device operative after a time delay so that the TURN ON pulse is then applied to the respective transistor and switches it on, and unidirectional conducting means connected to provide a path by passing the switching device which path immediately feeds each TURN OFF pulse applied to the control circuit to the respective transistor to switch it off, the length of the said time delay being such as to delay the switching on of each of the transistors sufficiently to ensure that the preceding transistor in the said order is first switched off.

3. A circuit arrangement according to claim 2, in which each electronic switching device comprises a controlled rectifier device having cathode, anode and gate electrodes and connected in the base-emitter circuit of the respective transistor whereby to block the application of the TURN ON pulse to the base and emitter of the transistor until the device is rendered conductive, and each time delay circuit comprises a resistance-capacitance circuit connected to respond to the TURN ON pulse and having the gate electrode of the respective one of the controlled rectifier devices connected to it whereby that controlled rectifier device is rendered conductive after the said time delay.

4. A circuit arrangement according to claim 3, in which each control circuit has a pair of terminals for receipt of the TURN ON and TURN OFF pulses, one terminal being connected to the base of the respective transistor, the other connected to the emitter thereof through the controlled rectifier device, and in which the resistance-capacitance time delay circuit is connected across the two terminals with the gate and cathode electrodes of the controlled rectifier device connected across the capacitance thereof.

5. An electrical inverter circuit arrangement, comprising at least two transistors, means connecting their emitter-collector paths in parallel, a respective control circuit associated with each transistor for turning it on and off, means applying TURN ON and TURN OFF pulses respectively and simultaneously to the two control circuits whereby to switch one transistor on and the other off, and output means responsive to the current in at least one of the said paths whereby to produce an alternating output when the transistors are rendered conductive alternately, each control circuit comprising a respective electronic switching device connected in the base-emitter circuit of the transistor so as to allow a turn-on current to pass through the transistor in response to each said TURN ON pulse only when the electronic switching device is rendered conductive, a time delay circuit responsive to each said TURN ON pulse and connected to the electronic switching device whereby to render the electronic switching device conductive after a predetermined time delay so as to feed the said turn on current to the transistor, and unidirectional conducting means connected in parallel with the electronic switching device and so poled as to allow turn off current to flow through the transistor in response to each TURN OFF pulse applied to the control circuit, whereby the TURN ON and TURN OFF pulses respectively and simultaneously applied to the two control circuits switch one transistor off and, after the said predetermined time delay, switch the other transistor on, the predetermined time delay being of length such that the one transistor is completely switched off before the other is switched on.

6. A circuit arrangement according to claim 3, in which each electronic switching device is a semi-conductor controlled rectifier device, and each time delay circuit is a resistance-capacitance circuit.

7. A circuit arrangement according to claim 6, in which each control circuit has a pair of terminals for receipt of the TURN ON and TURN OFF pulses, one terminal being connected to the base of the respective transistor, the other connected to the emitter thereof through the controlled rectifier device, and in which the resistance-capacitance time delay circuit is connected across the two terminals with the gate and cathode electrodes of the controlled rectifier device connected across the capacitance thereof.

* * * * *